US008605599B2

(12) United States Patent
Yoo

(10) Patent No.: US 8,605,599 B2
(45) Date of Patent: Dec. 10, 2013

(54) METHOD AND APPARATUS FOR PROCESSING ASYNCHRONOUS AUDIO STREAM

(75) Inventor: Hoon Yoo, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 2528 days.

(21) Appl. No.: 11/268,891

(22) Filed: Nov. 8, 2005

(65) Prior Publication Data

US 2006/0122823 A1    Jun. 8, 2006

(30) Foreign Application Priority Data

Nov. 24, 2004    (KR) .................. 10-2004-0097141

(51) Int. Cl.
*H04L 12/26* (2006.01)
(52) U.S. Cl.
USPC .............................. 370/242; 704/226; 714/49
(58) Field of Classification Search
None
See application file for complete search history.

(56) References Cited

U.S. PATENT DOCUMENTS

| 5,579,317 | A | 11/1996 | Pang et al. | |
|---|---|---|---|---|
| 6,055,497 | A * | 4/2000 | Hallkvist et al. | 704/228 |
| 6,357,028 | B1 * | 3/2002 | Zhu | 714/751 |
| 6,421,802 | B1 * | 7/2002 | Schildbach et al. | 714/747 |
| 6,931,198 | B1 * | 8/2005 | Hamada et al. | 386/234 |
| 2001/0028634 | A1 * | 10/2001 | Huang et al. | 370/252 |
| 2004/0001599 | A1 | 1/2004 | Etter et al. | |
| 2004/0098257 | A1 * | 5/2004 | Katsuya | 704/226 |
| 2004/0168110 | A1 * | 8/2004 | Fuldseth et al. | 714/48 |
| 2005/0044471 | A1 * | 2/2005 | Chia et al. | 714/776 |

FOREIGN PATENT DOCUMENTS

| EP | 1 056 297 | | 11/2000 |
|---|---|---|---|
| JP | 07-336311 | | 12/1995 |
| JP | 2001-111610 | | 4/2001 |
| JP | 2001-204032 | | 7/2001 |
| JP | 2002-335230 | | 11/2002 |
| JP | 2003-037794 | | 2/2003 |
| JP | 2003218932 A | * | 7/2003 |
| WO | WO 01/33405 | | 5/2001 |

OTHER PUBLICATIONS

Perkins et al.: "A Survey of Packet Loss Recovery Techniques For Streaming Audio", vol. 12, No. 5, Sep. 1998.

* cited by examiner

*Primary Examiner* — Yemane Mesfin
*Assistant Examiner* — Khoa Huynh
(74) *Attorney, Agent, or Firm* — The Farrell Law Firm, P.C.

(57) ABSTRACT

A method and an apparatus for processing an asynchronous audio stream are provided. A corrupted PES packet is detected from an asynchronous audio PES stream, and the ADTS frames of the corrupted PES packet are detected and replaced with predetermined substitute ADTS frames. Thus, an AAC stream is restored from the PES stream.

4 Claims, 5 Drawing Sheets

METHOD AND APPARATUS FOR PROCESSING ASYNCHRONOUS AUDIO STREAM

PRIORITY

This application claims priority under 35 U.S.C. §119 to an application entitled "Method and Apparatus for Processing Asynchronous Audio Stream" filed in the Korean Intellectual Property Office on Nov. 24, 2004 and assigned Serial No. 2004-97141, the contents of which are incorporated herein by reference.

BACKGROUND OF THE INVENTION

1. Field of the Invention

The present invention relates generally to a method and apparatus for restoring an audio stream, and in particular, to a method and apparatus for storing an Advanced Audio Coding (AAC) stream from an asynchronous audio Packetized Elementary Stream (PES) stream.

2. Description of the Related Art

In satellite Digital Multimedia Broadcasting (DMB), audio data is transmitted in a predetermined transport stream on a broadcast channel which will be described with reference to FIG. 1.

Referring to FIG. 1, an AAC stream 102 is created by compressing and encoding the audio PCM (Pulse Coded Modulation) data of an audio PCM stream 100 in an MPEG-2 (Moving Picture Expert Group-2) AAC+SBR (Spectral Band Replication) CODEC (Coder-Decoder) and attaching a header to the compressed-coded audio data. The PCM stream 100 includes PCM frames each having PCM data in which 2,048 samples of data are sampled at 48 kHz. The AAC stream 102 includes Audio Data Transport Stream (ADTS) frames each having a compressed-coded PCM frame attached with an ADTS header. In FIG. 1, each ADTS header is denoted by 'A'.

The AAC stream 102 is segmented to a predetermined size in compliance with the ISO (International Organization for Standardization)/IEC (International Organization for Standardization) 13818-1 standard, and a header 112 is attached to each segment stream 114, thereby producing PES packets. These PES packets form a PES stream 104. The PES header 112 of each PES packet is denoted by "P" in FIG. 1.

The PES stream 104 is in turn segmented to a predetermined size and a header 116 is attached to each segment stream 118, thus creating TS (Transport Stream) packets. The TS packets form a TS stream 106.

Referring back to the PES stream 104, t0 through t5 inserted at the start of the PCM frames in the PCM frame 100 are time information values indicating when the audio information is to be represented in a decoder. The time information is included in part of PES header data as time stamps.

In order to deliver as much audio data as possible in TS packets of a fixed size, the conventional satellite DMB service does not synchronize the ADTS headers of the AAC stream to the PES headers of the PES stream. As noted from FIG. 1, the ADTS header "A" does not follow the PES header "P" all the time. This method is called an asynchronous PES scheme, which offers the benefit of transmitting as much audio data as possible in TS packets.

Without processing TS packets including an error, however, the asynchronous PES scheme restores the AAC stream to the form illustrated in FIG. 2 which illustrates an example of restoring a TS stream 200 to a PES stream 202 and then to an AAC stream 204 on the assumption that two TS packets 206 and 208 in the TS stream 200 are corrupted by errors. The PES stream 202 resulting from the TS stream 200 also includes corrupted PES data 210 and 212 corresponding to the TS packets 206 and 208. If the TS stream 200 does not contain any errors, the PES stream 202 can be restored similarly to the PES stream 104 illustrated in FIG. 1. But when the TS steam 200 contains errors such as those included in packets 206 and 208, the restored PES stream includes the corrupted PES data 210 and 212.

Similarly, the AAC stream 204 restored from the PES stream 202 includes corrupted data 214 and 216, unlike the AAC stream 102 illustrated in FIG. 1. The corrupted data 214 and 216 may include data field 218 corresponding to an ADTS header.

As described above, the AAC stream with corrupted data causes problems in an audio CODEC. In addition, if the data field 218 corresponding to size in the ADTS header is corrupted as illustrated in FIG. 2, the audio CODEC may experience a fatal error.

Discard of the corrupted PES data to prevent errors, causes a loss of the time information. As a result, the audio data is reproduced too fast and ADTS data with different headers are mixed in an ADTS frame, seriously affecting the audio CODEC.

SUMMARY OF THE INVENTION

Accordingly, the present invention provides an audio stream processing method and apparatus for increasing audio quality and system stability even when Packetized Elementary Stream (PES) packets are corrupted due to errors in an asynchronous audio PES stream.

Further, the present invention provides an audio stream processing method and apparatus for optimally restoring an Advanced Audio Coding (AAC) frame from a PES packet corrupted by errors in an asynchronous audio PES stream.

In addition, the present invention provides an audio stream processing method and apparatus for storing restored audio data in a syntaxically perfect structure so that stability can be ensured even when an audio stream is stored in an external device.

The above objects are achieved by providing a method and apparatus for processing an asynchronous audio stream.

In the asynchronous audio stream processing method and apparatus, a corrupted PES packet is detected from an asynchronous audio PES stream, and the ADTS frames of the corrupted PES packet are replaced with predetermined substitute ADTS frames. Thus, an AAC stream is restored from the PES stream.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

Figure 3:
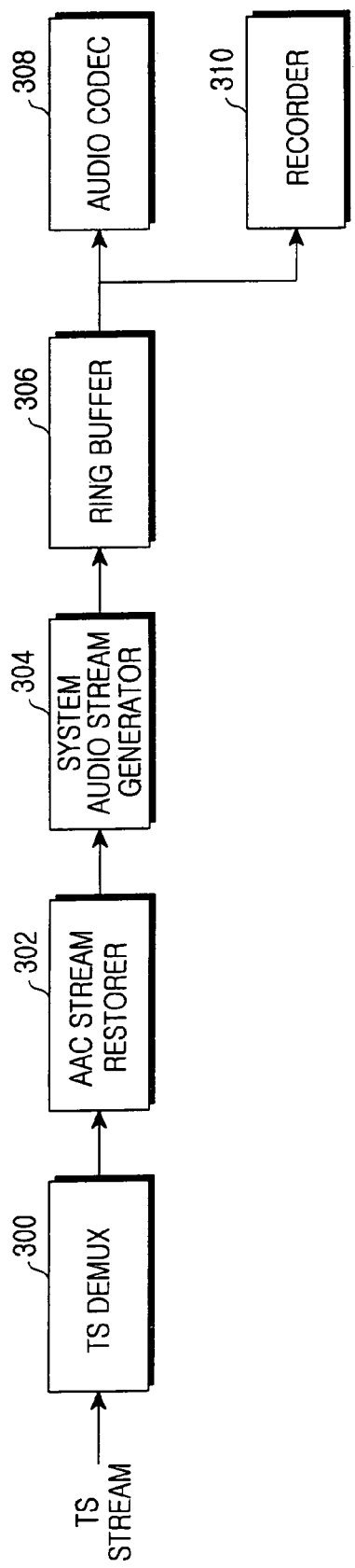
FIG. 3 is a block diagram of an audio stream processor according to an embodiment of the present invention.

FIG. 3 is a block diagram of an audio stream processor according to an embodiment of the present invention. The audio stream processor includes an AAC stream restorer 302, a system audio stream generator 304 and a ring buffer 306. A TS demultiplexer (DEMUX) 300 restores a PES stream from a TS stream. The PES stream may have corrupted data (e.g., data including errors, etc.). The AAC stream restorer 302 restores an AAC stream from the PES stream. In the presence of a corrupted PES packet, the AAC stream restorer 302 restores the AAC stream according to a syntax (which will be described below) by processing the corrupted PES data.

Figure 4:
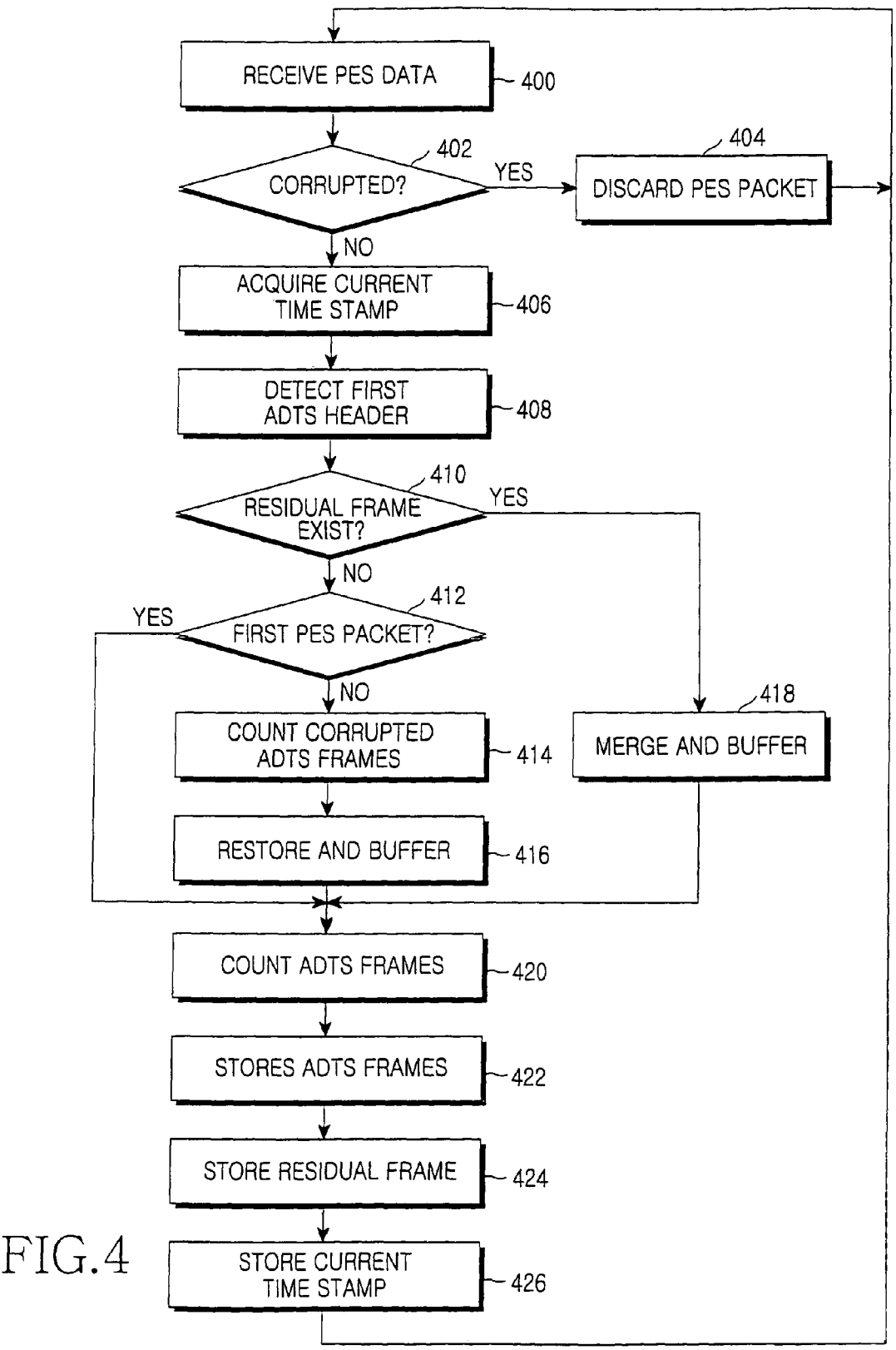
FIG. 4 is a flowchart illustrating an operation for processing asynchronous audio PES data according to an embodiment of the present invention.
Figure 5:
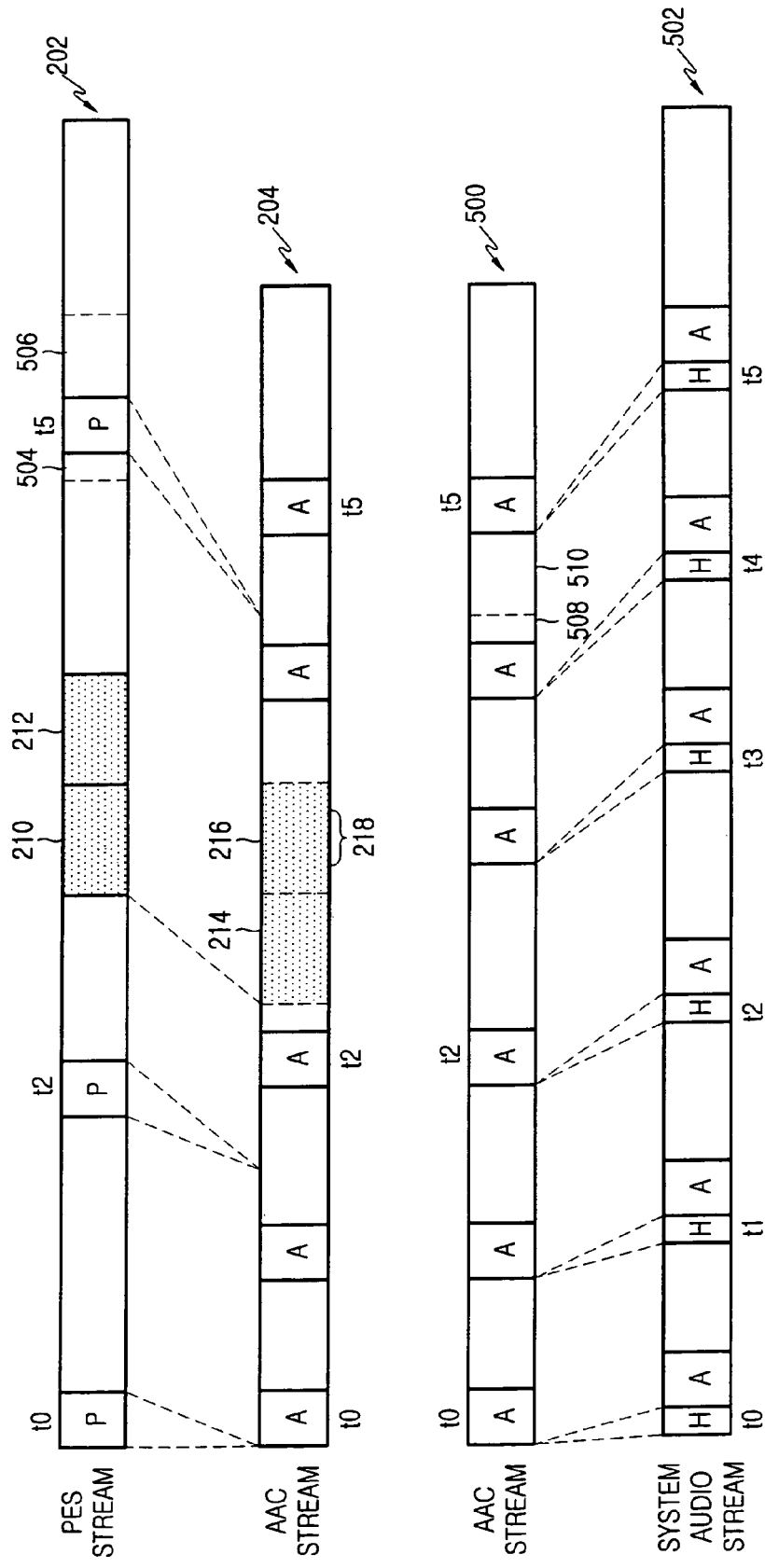
FIG. 5 is a diagram illustrating an AAC stream restoration according to an embodiment of the present invention.

The PES data processing of the AAC stream restorer 302 will be described below with reference to FIGS. 4 and 5. FIG. 4 is a flowchart illustrating an operation for processing asynchronous audio PES data according to an embodiment of the present invention. The asynchronous audio PES data is processed by the AAC stream restorer 302 in step 400 through step 426. FIG. 5 is a diagram illustrating restoration of a normal AAC stream 500 rather than the corrupted AAC stream 204 from the PES stream 202.

Referring to FIG. 4, the AAC stream restorer 302 receives PES data from the TS DEMUX 300 in step 400 and determines whether the PES data is a corrupted PES packet in step 402. If it is determined that the PES data includes a corrupted PES packet, the AAC stream restorer 302 discards the corrupted PES packet in step 404 and returns to step 400.

On the other hand, if it is determined that the PES data includes a normal PES packet and does not contain a corrupted PES packet, the AAC stream restorer 302 acquires a time stamp from the current PES packet in step 406 and searches for the first ADTS header from the current PES packet in step 408. If a current PES includes a prefix frame the prefix frame (e.g., prefix frame 506) is temporarily stored in step 408. The prefix frame is then used for restoring an ADTS frame from the current PES packet. In step 410, it is determined whether the current PES packet has a residual frame.

The prefix frame is more clearly illustrated with reference to FIG. 5 wherein reference numeral 506 denotes a prefix frame and reference numeral 504 denotes a residual frame. The prefix frame 506 refers to a segmented ADTS frame existing between the PES header P and the first ADTS header A in the current PES packet. The residual frame 504 refers to a segmented ADTS frame following the end of the previous normal PES packet. The residual frame 504 and the prefix frame 506 are created in the case where one ADTS frame is segmented over two PES packets when producing a PES stream from an AAC frame. If the current PES frame includes the residual frame 504, the residual frame is stored in step 424 and used for restoring an ADTS frame from the next PES packet.

Referring back to FIG. 4, in step 410, if it is determined that the PES data includes a residual frame, the residual frame is merged with the prefix frame and the merged frame is stored in step 418. As illustrated with reference to FIG. 5, the AAC stream 500 includes a residual frame 508 and a prefix frame 510 corresponding to the residual stream 504 and the prefix frame 506 of the PES stream 202 all of which are merged into a single ADTS frame.

In the absence of a residual frame in step 410, it is determined whether the current PES packet is the first one in step 412. That is, the AAC stream restorer 302 determines whether the current PES packet is the first packet of the PES stream, that is, the first received PES packet in DMB reception, for example.

If the PES packet is not the first packet of the PES stream, the AAC stream restorer 302 counts the number of lost ADTS frames in step 414. The number of lost ADTS frames is the number of ADTS frames in the corrupted PES packet between the previous normal PES packet and the current PES packet. The number and positions of deleted ADTS frames are known by the time stamps of the PES packets preceding and following the corrupted PES packet. That is, since a time interval per ADTS frame is known by the sampling frequency of the audio signal, the number of ADTS frames in the corrupted PES packet is calculated using the time stamps of the headers of the normal PES packets.

If the previous PES packet is corrupted and the current PES packet is a normal PES packet following the corrupted PES packet, the time stamp of the current PES packet (acquired in step 406) is stored in step 426 so that if the next PES packet is corrupted, the time stamp can be used in restoring a lost ADTS frame during processing the PES packet following the next PES packet.

An equal number of lost ADTS frames as was calculated in step 414 are replaced with predetermined ADTS frames and then the predetermined ADTS frames stored in step 416. The replacement can be performed in many ways. For example, an ADTS frame wherein mute is compressed is pre-stored and then, a lost ADTS frame can be replaced with the pre-stored ADTS frame. In addition, an ADTS frame wherein white noise is compressed is pre-stored and then, a lost ADTS frame can be replaced with the pre-stored ADTS frame. Or a normal ADTS frame restored from a normal PES packet preceding a corrupted PES packet is stored and then substituted for a lost ADTS frame. If a number of the at least one lost ADTS frame is greater than a predetermined value, the at least one lost ADTS frame is replaced with a predetermined one of the mute audio data and the white noise audio data and, if the number of the at least one lost ADTS frame is less than or equal to the predetermined value, the at least one lost ADTS frame is replaced with the normal audio data.

In the case where one or two frames of ADTS data are corrupted, they are replaced by the previous normal ADTS frame. If consecutive ADTS frames are corrupted, they can be replaced with mute-compressed ADTS frames or white noise-compressed ADTS frames. In this case, since the difference between the audio data of a lost ADTS frame and the audio data of the previous normal ADTS frame may be very wide, it is preferable to replace the lost ADTS frame with the mute-compressed or white noise-compressed ADTS frame. Mute-compressed ADTS frames are ADTS frames wherein mute is compressed. Likewise, white noise-compressed ADTS frames are ADTS frames wherein white noise is compressed.

After calculating the number of ADTS frames in the corrupted PES packet and the current PES packet in step 420, the ACC stream restorer 302 stores as many ADTS frames as calculated, in step 422. The ADTS frames of the corrupted PES packet are replaced with the above-described substitute ADTS frames and the ADTS frames of the current PES packet are stored normally.

The residual frame and the time stamp of the current PES packet are stored in steps 424 and 426, for use in restoring lost ADTS frames during processing a normal PES packet following the next PES packet which is corrupted. The ACC stream restorer 302 then returns to step 400, for processing the next PES packet.

In this way, the ADTS frames within a PES packet are restored without errors and lost ADTS frames are appropriately replaced.

Figure 1:
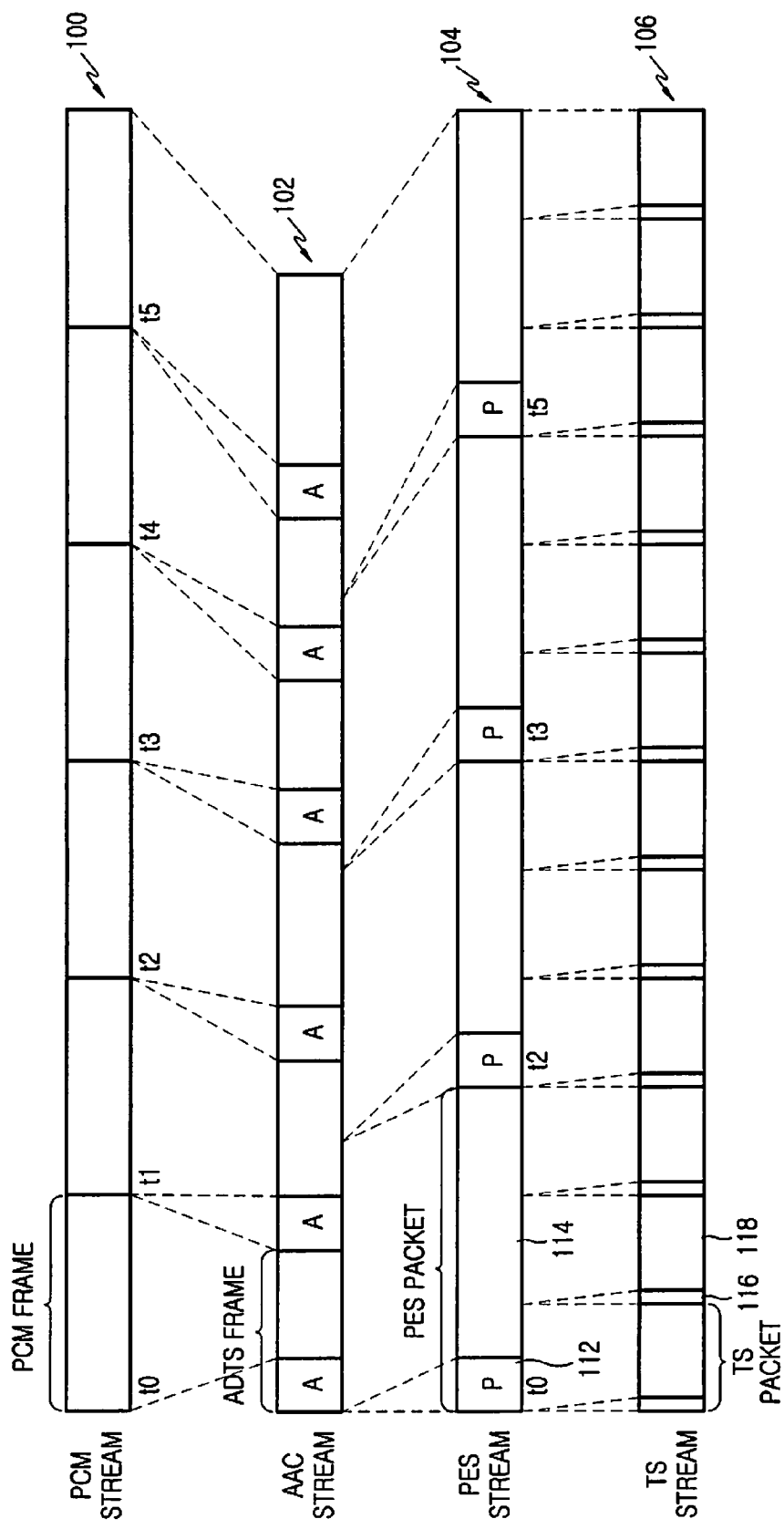
FIG. 1 is a diagram illustrating an example of an audio stream configuration in a satellite DMB service.
Figure 2:
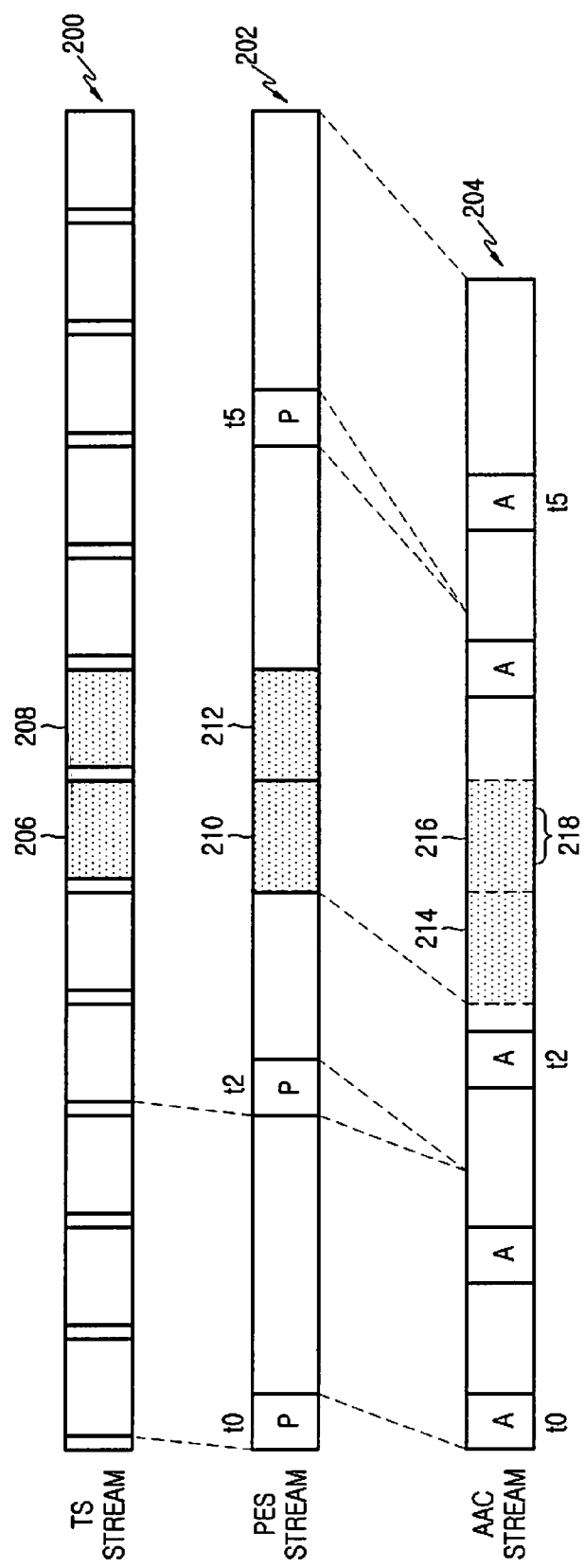
FIG. 2 is a diagram illustrating an example of a restored AAC stream including packets having corrupted data.

Referring back to FIG. 3, the restored AAC stream is provided to the system audio stream generator 304. The system audio stream generator 304 generates a system audio stream 502 by attaching a header H to each ADTS frame of the AAC stream, as illustrated in FIG. 5, and stores the system audio stream 502 in the ring buffer 306. The header H includes time information. The system audio stream generator 304 can include the original time information t0 through t5 (illustrated in FIG. 1) in the system audio stream 502 using time information based on the time stamps of normal PES packets before and after a corrupted PES packet.

As the system audio stream 502 is stored in the ring buffer 306, the frames of the system audio stream are cyclically stored and read. Thus, despite the time delay involved in restoring lost ADTS frames in the AAC stream restorer 302, that is, the time delay of ADTS frame output until a normal PES packet follows a corrupted PES packet, the system audio stream can be normally output through buffering. The system audio stream stored in the ring buffer can be reproduced in an audio CODEC 308 or recorded in a recorder 310.

As described above, the present invention restores ADTS frames from a PES packet without syntax errors and replaces lost ADTS frames appropriately. Therefore, audio noise caused by errors created either before and/or during the transmission of satellite DMB broadcasting can be reduced or entirely eliminated and the stability of a CODEC and a corresponding system enhanced.

Furthermore, when broadcasting is recorded in an error environment, it can be stored in files free of syntax errors. Therefore, stability is provided to the system when the recorded audio data is reproduced.

While the invention has been shown and described with reference to certain preferred embodiments thereof, they are merely an exemplary embodiments. While the embodiments of the present invention have been described in the context of a satellite DMB, the present invention is also applicable to other systems capable of processing asynchronous audio PES streams. Thus, it will be understood by those skilled in the art that various changes in form and detail may be made therein without departing from the spirit and scope of the invention as defined by the appended claims.

What is claimed is:

1. A method of restoring an Advanced Audio Coding (AAC) stream from an asynchronous audio Packetized Elementary Stream (PES) stream, the method comprising the steps of:

detecting, by an AAC stream restorer, at least one corrupted PES packet among PES packets of the PES stream; and restoring, by the AAC stream restorer, the AAC stream by replacing at least one lost Audio Data Transport Stream (ADTS) frame within the at least one corrupted PES packet with corresponding predetermined substitute audio data, which is one of mute audio data, white noise audio data and normal audio data based on audio data of at least one normal PES packet adjacent to the at least one corrupted PES packet, wherein, if a number of lost ADTS frames is greater than a predetermined value, the lost ADTS frames are replaced with predetermined one of the mute audio data and the white noise audio data, wherein, if the number of the lost ADTS frames is equal to or less than the predetermined value, the lost ADTS frames are replaced with the normal audio data, and wherein the number of the lost ADTS frames is based on a time stamp included in the at least one normal PES packet.

2. The method of claim 1, wherein the restoring step comprises:

counting the number of the lost ADTS frames within the at least one corrupted PES packet.

3. An apparatus for processing an asynchronous audio Packetized Elementary Stream (PES) stream, the apparatus comprising:

a processor for restoring an Advanced Audio Coding (AAC) stream by replacing at least one lost Audio Data Transport Stream (ADTS) frame within at least one corrupted PES packet in the PES stream with predetermined substitute audio data, which is one of mute audio data, white noise audio data and normal audio data based on audio data of at least one normal PES packet adjacent to the at least one corrupted PES packet, and for generating a system audio stream with the restored AAC stream; and a buffer for buffering the system audio stream, wherein, if a number of the lost ADTS frames is greater than a predetermined value, the lost ADTS frames are replaced with predetermined one of the mute audio data and the white noise audio data, wherein, if the number of the lost ADTS frames is equal to or less than the predetermined value, the lost ADTS frames are replaced with the normal audio data, and wherein the number of the lost ADTS frames is based on a time stamp included in the at least one normal PES packet.

4. The apparatus of claim 3, wherein the number of the lost ADTS frames are counted within the at least one corrupted PES packet.

* * * * *